Figures 1, 2:
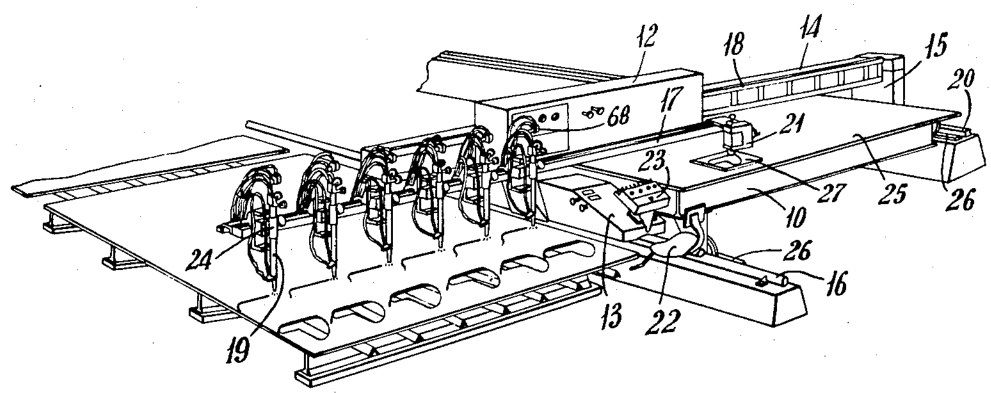

April 9, 1963 J. A. ARNAULT ET AL 3,084,923

CIRCLE CUTTING ATTACHMENT

Filed April 3, 1959

INVENTORS
JOSEPH ARNAULT
ALFRED J. MILLER

BY Richard S. Shreve Jr.
ATTORNEY

United States Patent Office 3,084,923 Patented Apr. 9, 1963

3,084,923
CIRCLE CUTTING ATTACHMENT

Joseph A. Arnault, Fanwood, and Alfred J. Miller, Westfield, N.J., assignors to Union Carbide Corporation, a corporation of New York Filed Apr. 3, 1959, Ser. No. 803,879
1 Claim. (Cl. 266—23)

This invention relates to circle cutting attachments particularly for shape cutting machines wherein the tracing mechanism is of the photocell type and the drive mechanism is of the coordinate-drive type. An example of a coordinate-drive admirably suited for the machine of the invention is disclosed in W. L. Martin application, Serial No. 677,599, now Patent No. 2,999,196.

Circle cutting attachments of the prior art used a radius rod to hold the tracer drive wheel at a fixed distance from the center point of the circle being described and to hold the tracer wheel turned tangent to the circle. This type of circle cutting attachment is not applicable to a shape cutting machine powered by a coordinate drive-type tracer such as the subject machine since this type tracer does not use a tracer drive wheel.

The circle cutting attachment provided with the subject machine is one in which the photocell gets its direction signal from a segment of line drawn on an attachment to the end of a radius rod which is constrained to rotate with the tracing head. Thus the radius rod will serve as a small section of template, with a readily adjustable radius. This circle cutting attachment eliminates the need for a family of different sizes of circular templates and once fixed to the template table permits circles of varying radii to be cut by merely changing the radius.

The main obejct of this invention is to provide means associated with the photocell tracing mechanism whereby a circular shape may easily and accurately be cut without the use of a template.

In the drawings:

FIG. 1 is a perspective view of a shape cutting machine according to the preferred embodiment of the present invention; and FIG. 2 is a perspective view of the circle cutting mechanism.

As shown in FIG. 1 the double carriage shape cutting machine comprises a gantry type main carriage 10 and a cross carriage 12 thereabove. The main carriage comprises a lower saddle 13, an upper cross bridge 14 and a supporting leg 15. The saddle 10 has two pair of wheels which ride on a guide track 16. The supporting leg 15 has a wheel which rides on a track 20 parallel with the guide track 16.

Thus the entire main carriage is removable longitudinally along on the tracks 16 and 17, on a three point support system. This prevents bending moments in the machine when the tracks are not perfectly level, and assures firm seating of the two pair of wheels of the saddle 13 on the guide track 16, which is important for cutting accuracy.

The upper cross bridge 14 extends from the supporting leg 15 over and beyond the saddle 10 and carries a track 18 on which the cross carriage 12 is mounted for movement transverse to the tracks 16 and 20. Secured to the cross carriage 12 is a blowpipe supporting boom 17 extending over and beyond the saddle 10 and carrying a plurality of blowpipes 19 mounted for adjustment therealong. On the rear end of the boom 17 is mounted a tracing mechanism 21 for adjustment therealong.

Also provided with the machine is a template table 25 which rides on a pair of rails 26, inside and parallel to the tracks 3 and 11 of the gantry type carriage, which spans the table 25. Provided on the table 25 at the corner nearest the central control 23 is a hand wheel for moving said table 25 along said tracks 26. Associated with said hand wheel is a knob provided for locking the table 25 in position. The table 25 is provided for carrying a template 27.

According to the present invention, the circle cutting attachment comprises a base 50 having pivoted thereon a graduated radius rod 52, provided at its other end with a caster type wheel 53. Movably mounted on said radius rod is a template platform 54 provided with a set screw for positioning the platform along the rod 52. Mounted at one end in a vertical plane on said platform 54 is a wire abutment 56. The wire abutment 56 and the platform 54 form a right angle with each other. Inscribed on platform 54 is a line 60 which acts as a segment of a template from which the photocell tracing unit picks up a signal.

In actual operation the operator adjusts the platform 54 relative to the radius rod 52 to give the desired size circle. The photocell unit then is positioned over either one of the lead-in lines 62 or 64 depending upon which side of the cut circular shape is considered to be scrap material. For example, if a circle is to be cut and the material within the circumference is the piece to be used, the photocell will be positioned over lead-in line 62. If a hole is to be cut out of the workpiece and the area inside the circle is to be scrap, the photocell will be positioned over lead-in line 64.

When the photocell unit is started in tracing operation along the lead-in line, the radius rod 52 and the platform 54 remain stationary until the lens holder 66 of the photocell unit reaches the abutment. As the photocell unit travels forward along the lead-in line, the blowpipes start the cutting operation on the scrap side of the circle to be cut. When the lens holder 66 strikes the abutment 56, the photocell unit is automatically at the correct radius distance for the desired circle, and the blowpipe has likewise reached a point on the circumference of the circular shape to be cut.

Continued travel of the photocell unit necessarily applies a pushing force by lens holder 66 against abutment 56, thereby causing the template platform 54 to move in a circular path at a fixed radius, as determined by the position of platform 54 on radius rod 52, about its pivot on base B. Thus a point on the template line 60, located under the photocell unit travels in a circular path at a preset radius. In effect this is the same as having the photocell unit trace a circular line template.

The photocell unit, following the point on the line which is moving in a circular path, steers the machine and thus causes said machine to travel in a corresponding circular path.

What is claimed is:

In a shape cutting machine having a pattern table, a photocell tracer movable over said pattern table to trace a contour thereon, and driving means responsive to said photocell for propelling said tracer along said contour, the improvement which comprises in combination therewith a cutting attachment having a base mounted on said pattern table, a radius rod pivoted on said base, a platform adjustable along said radius rod and having a line perpendicular to said rod, said platform being positioned under said tracer to cause tracing along said line, said platform having an abutment engaged by said photocell tracer to swing said platform and move said line thereon about the pivot of said radius rod to trace the circle tangent to said moving line.

References Cited in the file of this patent

UNITED STATES PATENTS 2,095,710 Offutt et al. ............ Oct. 12, 1937

(Other references on following page)

UNITED STATES PATENTS

| | | |
|---|---|---|
| 2,202,131 | Wagner | May 28, 1940 |
| 2,244,822 | Bucknam | June 10, 1941 |
| 2,279,338 | Oldham | Apr. 14, 1942 |
| 2,284,005 | McKierman | May 26, 1942 |
| 2,336,626 | Mott et al. | Dec. 14, 1943 |
| 2,364,645 | Mott et al. | Dec. 12, 1944 |
| 2,429,326 | Miller et al. | Oct. 21, 1947 |
| 2,480,281 | Begerow | Aug. 30, 1949 |
| 2,508,468 | Rathje | May 23, 1950 |
| 2,710,934 | Senn | June 14, 1955 |
| 2,723,845 | Przybylski et al. | Nov. 15, 1955 |
| 2,766,982 | Bechtle et al. | Oct. 16, 1956 |

FOREIGN PATENTS

| | | |
|---|---|---|
| 412,093 | Great Britain | June 21, 1934 |

OTHER REFERENCES

General Electric Review June 1950, pages 44–47.

The Iron Age, May 1, 1958, pages 90–91.

German printed application, Sch 9537 Ib/49h, May 17, 1956.